March 27, 1934. H. W. STERTZBACH 1,952,390
SAFETY SUPPORT FOR END BRAKE BEAMS
Filed April 19, 1930 2 Sheets-Sheet 1

Inventor
H.W.Stertzbach.
By Seymour & Bright
Attorneys

March 27, 1934. H. W. STERTZBACH 1,952,390
SAFETY SUPPORT FOR END BRAKE BEAMS
Filed April 19, 1930 2 Sheets-Sheet 2
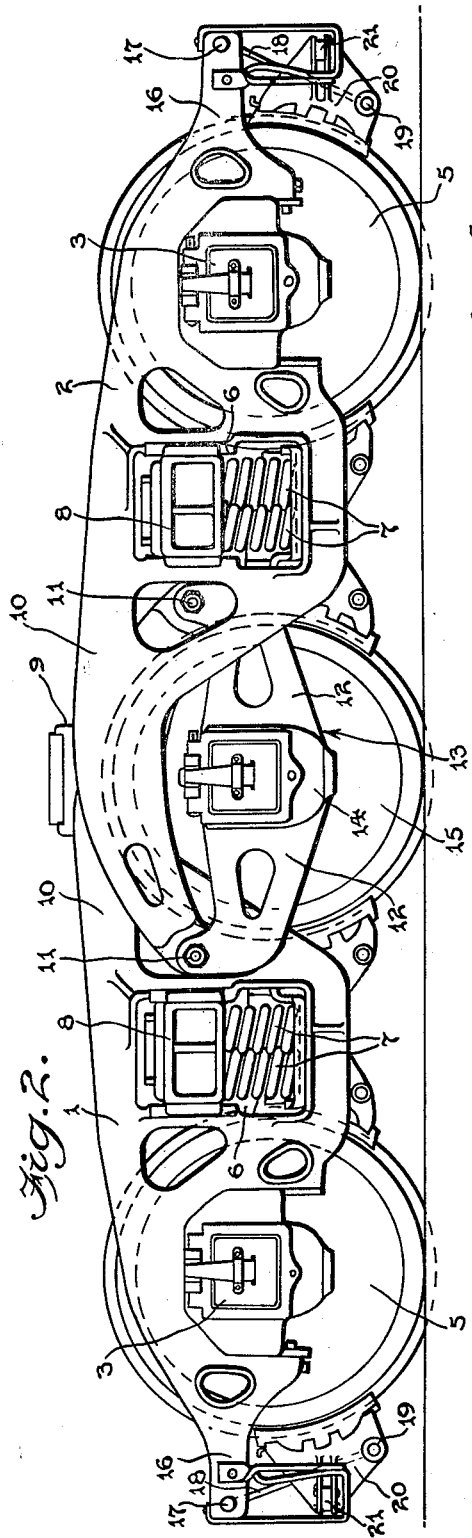
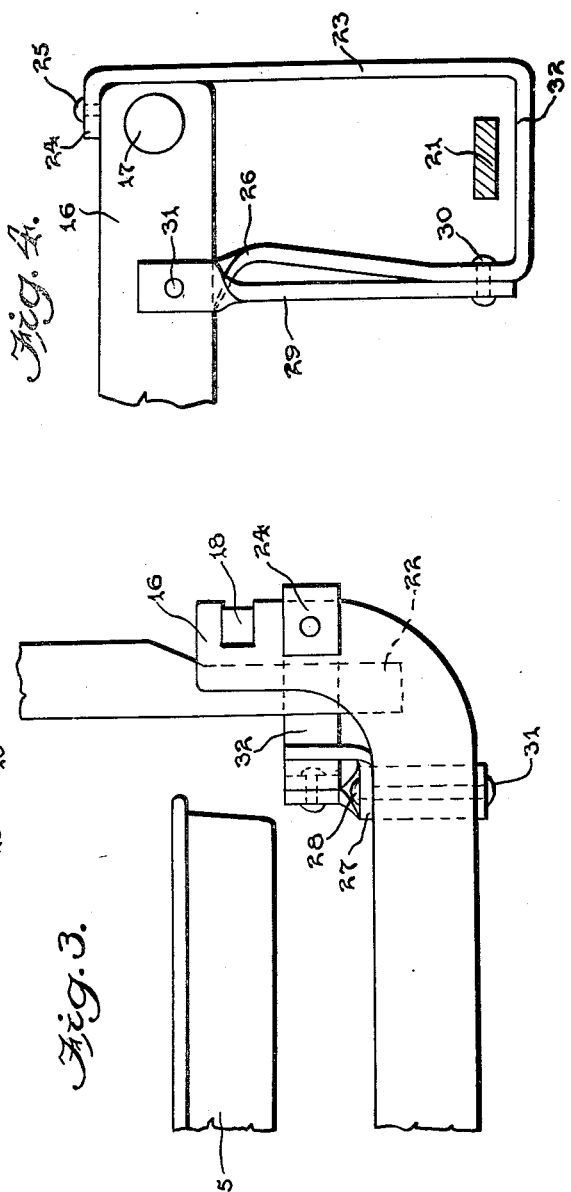
Inventor
H. W. Stertzbach,
By Seymour & Bright
Attorneys Patented Mar. 27, 1934

1,952,390

UNITED STATES PATENT OFFICE 1,952,390

SAFETY SUPPORT FOR END BRAKE BEAMS

Harry W. Stertzbach, Columbus, Ohio, assignor to The Buckeye Steel Castings Company, Columbus, Ohio Application April 19, 1930, Serial No. 445,709

10 Claims. (Cl. 188—210)

The present invention pertains to safety supports for the end brake beams of car trucks, and more especially to end brake beams of the kind employed with "clasp" brakes, that is, brakes employing two brake shoes per wheel.

The end brake beams of such trucks are usually secured to the brake heads which are suspended from the end brake hanger brackets, by means of brake hangers. In case one of the hangers should break, if no auxiliary means are provided to prevent the brake beam from falling, the latter will drop to the track, and if the beam is on the front end of the truck, there is a serious possibility of its getting under the wheels and derailing the truck.

Heretofore, it has been proposed to provide auxiliary safety supports for the purpose of catching brake beams in case of accident, but so far as I am aware, no one prior to this invention, has proposed safety supports for the end brake beams constructed and functioning in the same manner as my invention.

The primary object of the present invention is to provide improved means carried by the side frames of the truck for supporting an end brake beam in case of failure of a brake hanger.

Another object of the invention is to provide a safety support which may be used with a conventional end of the truck without altering the latter, and this is accomplished by simply projecting the extremities of the end brake beam laterally, so that these ends may cooperate with my improved safety supports.

The invention further consists in the parts and combination of parts as will be more fully explained and pointed out in the claims.

While the invention will be disclosed in connection with a six-wheel truck, it is to be understood that it may also be used with four-wheel trucks.

In the accompanying drawings,

Fig. 2 is a side elevation of the same.

Fig. 3 is a plan view of a detail.

Fig. 4 is an elevation of the same.

Figure 1:
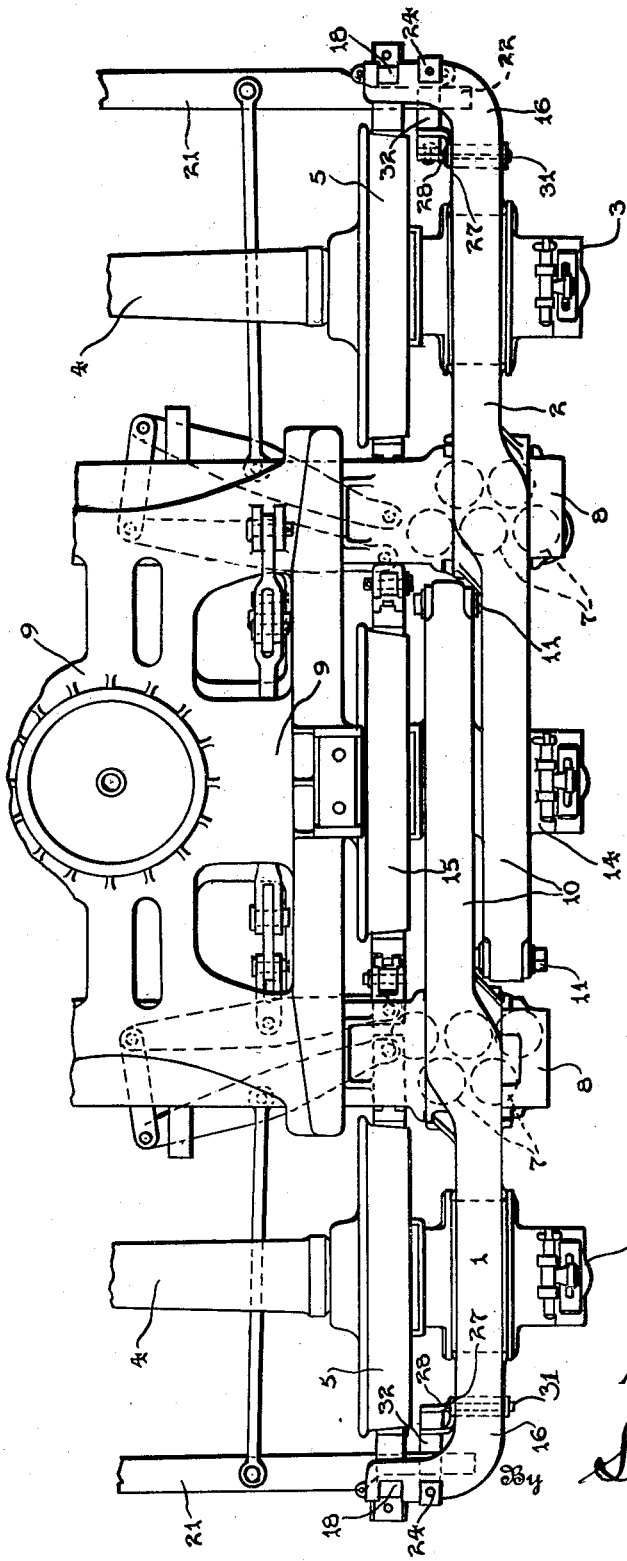
Fig. 1 is a plan view of one-half of a six-wheel car truck equipped with my improvements.

Referring to the drawings, 1 and 2 designate the end members of a conventional six-wheel truck. Each of these members is provided with a journal box 3 for the end axle 4 of a pair of the end wheels 5.

A bolster opening 6 in each end member accommodates springs 7, and on the springs, the transverse bolsters 8 are mounted, which support the main or longitudinal bolster 9.

Long arms 10 are integral with the end members and extend toward one another in overlapping relation, as best shown in Fig. 1, and the ends of these arms are pivotally connected at 11 to oppositely extending arms 12 of a central equalizer 13. The latter is provided with a journal box 14 for the axle of the central wheels 15.

With such a construction, it is obvious that each of the end members may oscillate with its journal box, and that the central member 13 may oscillate with its journal box 14, and of course, the different members can move about the pivots 11.

If the invention is applied to a truck of this character, the ends of the side frame will have oppositely projecting inwardly extending arms 16 which pivotally support at 17, the usual brake hangers 18. These hangers pivotally support at 19, the heads 20 of the end brake shoes, and corresponding heads at opposite sides of the truck are connected by an end brake beam 21 which may be actuated by any suitable means for applying the brakes.

For the purpose of the present invention, the ends 22 of the end brake beams, as best shown in Fig. 3, are projected outwardly beyond the outer surfaces of the wheels, in order that stirrups 23 may be extended beneath the projecting ends of the beam. In accordance with the invention, the stirrup may consist of a thick piece of strap metal having one of its ends extending horizontally as shown at 24, and lying upon and secured to the top of the arm 16, by means of a rivet 25 or the like.

The upper end portion of the other arm of the stirrup is twisted, as shown at 26, to provide an ear 27 which lies against the inner face of the side frame and is secured thereto by a rivet 28. This arm may be reinforced by a brace 29 which has its lower end rigidly connected thereto by a rivet 30, and its upper end secured to the outer surface of the side frame, as shown at 31.

It will be manifest from the foregoing that in case of breakage of one of the hangers 18, the end brake beam 21 would drop downwardly until it came to rest on the bottom 32 of the stirrup, and the latter would prevent the beam from falling on to the track.

While I have disclosed what I now consider to be a preferred embodiment of the invention, it is believed that changes may be made in the details set forth, without going outside the scope of the appended claims.

What I claim and desire to secure by Letters Patent is:

1. In combination, a car truck including an end wheel, a side frame having an inwardly extending arm, an end brake beam having an end extension projecting outwardly beyond said wheel, and a safety support for said extension carried by the side frame and lying in a plane arranged between the wheel and the main portion of the side frame.

2. In a car truck, an end wheel, a side frame having an arm at the end thereof projecting inwardly into overlapping relation with said wheel, an end brake beam having its extremity extended outwardly into the plane of the main portion of the side frame, and a safety support arranged outwardly beyond said wheel for said extension having one of its ends connected to the arm and its other end connected to the main portion of the side frame.

3. A car truck including an end wheel, a side frame arranged on the outer side of the wheel, a transverse end brake beam having its extremity projecting outwardly beyond the outer surface of the wheel, and a safety support for the beam arranged in a plane lying between the side frame and wheel.

4. A car truck including an end wheel, a side frame arranged on the outer side of the wheel, a transverse end brake beam having its extremity projecting outwardly beyond the outer surface of the wheel, and a safety support for the beam arranged in a plane lying between the side frame and wheel, said safety support comprising a stirrup having one of its ends connected to the upper surface of the side frame, and its other end connected to a side surface of the side frame.

5. A car truck including an end wheel, a side frame arranged on the outer side of the wheel, a transverse end brake beam having its extremity projecting outwardly beyond the outer surface of the wheel, and a safety support for the beam, arranged in a plane lying between the side frame and wheel, said safety support including a strap metal stirrup which extends below said beam and has one of its ends resting on the top of the side frame, the other end portion of said stirrup being twisted and having its extremity secured to one side surface of the side frame.

6. A car truck including an end wheel, a side frame arranged on the outer side of the wheel, an end brake beam having its extremity projecting outwardly beyond the outer surface of the wheel, a safety support for the beam, arranged in a plane lying between the side frame and wheel, said safety support including a strap metal stirrup which extends below said beam and has one of its ends resting on the top of the side frame, the other end portion of said stirrup being twisted and having its extremity secured to one side surface of the side frame, and a brace bar connecting one arm of said stirrup to the opposite side surface of the side frame.

7. The combination with a car truck side frame provided at one end thereof with an inwardly extending arm, of an end brake beam safety support comprising a stirrup adapted to extend below an end brake beam of the truck and having upwardly extending arms, one of said arms having its extremity bent over and lying upon the upper surface of the arm of the side frame, and the other arm of the stirrup being twisted and having its extremity secured to one side surface of the side frame, and a brace bar having one of its ends rigidly secured to the last mentioned arm and its other end rigidly secured to the opposite side surface of the side frame.

8. In a car truck, an end wheel, a side frame arranged at one side of said wheel, a transverse end brake beam having one of its ends projecting outwardly beyond the outer surface of said wheel, and a safety support for the brake beam carried by the side frame outwardly beyond the wheel and extending beneath the projecting portion of said beam.

9. In a car truck, opposite side frames, each consisting of end members and a central equalizing member flexibly connected together, a journal box on each of said side frame members, axles extending into said journal boxes, intermediate and end wheels mounted on said axles, transverse end brake beams having extremities projecting outwardly beyond the outer surfaces of the end wheels, and safety supports for the end beams carried by the outer ends of the end members of each side frame, arranged in a plane lying between the side frame and end wheel and extending beneath the projecting portions of the end beams, the end members of the opposite frames being unconnected.

10. In a car truck provided with wheels, a side frame member and a transverse end brake beam, an end of said beam having an extension projecting outwardly beyond a wheel, and a safety support for the extension carried by an end of the side frame member and arranged outwardly beyond said wheel to permit the side frame member and support to be moved outwardly as a unit when it is desired to disconnect a wheel.

HARRY W. STERTZBACH.